(12) United States Patent
Schell

(10) Patent No.: US 11,870,491 B2
(45) Date of Patent: Jan. 9, 2024

(54) METHOD AND APPARATUS FOR MEASUREMENT OF MODE DELAY IN OPTICAL FIBERS

(71) Applicant: Fluke Corporation, Everett, WA (US)

(72) Inventor: J. David Schell, Austin, TX (US)

(73) Assignee: Fluke Corporation, Everett, WA (US)

( * ) Notice: Subject to any disclaimer, the term of this patent is extended or adjusted under 35 U.S.C. 154(b) by 276 days.

(21) Appl. No.: 17/153,798

(22) Filed: Jan. 20, 2021

(65) Prior Publication Data

US 2022/0231759 A1    Jul. 21, 2022

(51) Int. Cl.
| | |
|---|---|
| *H04B 10/079* | (2013.01) |
| *H04B 10/25* | (2013.01) |
| *G01M 11/00* | (2006.01) |
| *G02B 6/42* | (2006.01) |
| *G02B 6/028* | (2006.01) |

(52) U.S. Cl.
CPC ......... *H04B 10/0795* (2013.01); *G01M 11/33* (2013.01); *G02B 6/4206* (2013.01); *H04B 10/25* (2013.01); *G02B 6/0288* (2013.01)

(58) Field of Classification Search
CPC ... H04B 10/0795; H04B 10/25; G01M 11/33; G02B 6/4206; G02B 6/0288
See application file for complete search history.

(56) References Cited

U.S. PATENT DOCUMENTS

| | | | | |
|---|---|---|---|---|
| 2002/0076184 A1* | 6/2002 | Iyoki | ..................... | B82Y 35/00 385/12 |
| 2002/0131699 A1* | 9/2002 | Raguin | .................. | G02B 6/322 385/33 |
| 2004/0027566 A1* | 2/2004 | Suzuki | ................... | G02B 23/16 356/302 |
| 2004/0247240 A1* | 12/2004 | Teramura | ............. | G02B 6/4206 372/50.1 |

(Continued)

FOREIGN PATENT DOCUMENTS

EP        1705471 B1     6/2012

OTHER PUBLICATIONS

Compertore, David C., Filipp V. Ignatovich, and Michael A. Marcus. "Fiber coupler end face wavefront surface metrology." Applied Advanced Optical Metrology Solutions. vol. 9576. SPIE, 2015. (Year: 2015).*

(Continued)

*Primary Examiner* — Dominic J Bologna
(74) *Attorney, Agent, or Firm* — Seed IP Law Group LLP

(57) ABSTRACT

A system for testing an optical fiber includes an optical source apparatus and an optical image sensor apparatus. The optical source apparatus includes a fiber optic connector that connects to a first end of the fiber, and a light emitting device which emits light into the first end of the fiber. The optical image sensor apparatus includes a fiber optic connector that connects to a second end of the fiber, an image sensor that receives light output from the second end of the fiber and (Continued)

generates corresponding image data, a lens array in an optical path between the fiber optic connector and the image sensor, and a processor coupled to the image sensor. The processor, in operation, determines a set of two-dimensional positions based on the image data output from the image sensor, and determines a test result based on the set of two-dimensional positions.

20 Claims, 4 Drawing Sheets

(56) References Cited

U.S. PATENT DOCUMENTS

| | | | | |
|---|---|---|---|---|
| 2006/0132790 | A1* | 6/2006 | Gutin | G01B 9/02034 |
| | | | | 356/479 |
| 2006/0215975 | A1* | 9/2006 | Kim | G01M 11/3172 |
| | | | | 385/123 |
| 2015/0015879 | A1* | 1/2015 | Papadopoulos | G02F 1/011 |
| | | | | 356/301 |
| 2020/0041731 | A1* | 2/2020 | Cuno | G02B 6/3843 |
| 2021/0226714 | A1* | 7/2021 | Ye | H04B 17/27 |
| 2022/0052511 | A1* | 2/2022 | Lu | H01S 5/0267 |

OTHER PUBLICATIONS

Chernyshov, Alexander, et al. "Calibration of a Shack-Hartmann sensor for absolute measurements of wavefronts." Applied optics 44.30 (2005): 6419-6425. (Year: 2005).*

Meng, Qingbin, et al. "Effect of ambient temperature on the measurement accuracy of Shack-Hartmann wavefront sensor." 2015 International Conference on Optical Instruments and Technology: Advanced Lasers and Applications. vol. 9621. SPIE, 2015. (Year: 2015).*

Ahn et al., "Optical frequency-domain modal dispersion measurement in multimode fibers using intermodal interferometer," *Optical Society of America*, 2006, 3 pages.

Ellis, "The Importance of minEMBc Laser Bandwidth Measured Multimode Fiber for High Performance Premises Networks," *Corning Incoporated*, 2007, 13 pages.

Photonics Technical Note #21 Fiber Optics (Newport Corporation, http://assets.newport.com/webDocuments-EN/images/Fiber-Basics.pdf, 2015).

* cited by examiner

METHOD AND APPARATUS FOR MEASUREMENT OF MODE DELAY IN OPTICAL FIBERS

BACKGROUND

Technical Field

The present disclosure relates to testing of optical fibers, and more particularly to methods and apparatuses in which mode delay is measured during testing of optical fibers.

Description of the Related Art

Group velocities of various modes of light in a multimode fiber are generally different, resulting in mode-dependent group delays for a given length of optical fiber. The phenomenon of intermodal dispersion is generally a limiting factor for an achievable transmission bandwidth (or data rate) in optical fiber communications in which multimode fibers are used.

A differential mode delay (DMD) can be specified for quantifying intermodal dispersion in optical fibers that are used for optical communications. DMD is sometimes called differential modal delay or differential group delay. DMD can be understood as the difference between the maximum time delay and the minimum time delay (group delay) of a short signal pulse within a certain length of an optical fiber under test. Conventionally, DMD must be measured under carefully standardized conditions, for example, in a laboratory environment using bandwidth-limited ultrashort pulses with a certain pulse duration well below a DMD result. The pulses should be in a diffraction-limited beam at a certain optical center wavelength, and the time delay should be measured for a range of radial positions of the input beam across the fiber core. Special DMD analyzer tools have been developed for such measurements.

The DMD test concept was first developed by Corning during the 1970's to analyze modal delay of graded index multimode fibers. The standardized fiber test method for 10 Gigabit Ethernet, developed in 2002, utilizes a high-power 850 nm single-mode laser source with a spot size of about 5 microns. This laser beam scans across the diameter of the 50 micron multimode fiber under test in steps of 2 microns. For example, see FIG. 3 in R. Ellis, "The importance of minEMBc laser bandwidth measured multimode fiber for high performance premises networks," White Paper WP1150 (Corning Inc., Corning, USA, 2007). At each offset position a short impulse of light is launched into the fiber under test. Output responses U(r,t), corresponding to each launch at every offset position, r, are collated to produce a DMD. The DMD output provides a virtual mapping of the individual modal pulse delays within the fiber under test, represented by the temporal position on the x-axis (time delay) versus the pulse amplitude and radial off-set position plotted on the y-axis (centered relative to the core geometry of the fiber). Hence the DMD technique is capable of obtaining a detailed signature of the modal delay structure of the fiber under test.

The DMD test method is very time consuming and does not lend itself to field testing of optical fibers (e.g., testing that is not performed in a laboratory). For example, a pulsed laser used in this test method is large and heavy due to the power and configuration required to generate picosecond pulses. Also, alignment of the laser to the fiber is laborious, even if automated. In order to maintain alignment, vibration isolation or damping equipment is required (e.g., table, mounts, etc.). In addition, the measurement of picosecond pulses requires a very high speed oscilloscope which is large and costly. Further, measurements performed using the DMD test method are generally limited to highly skilled persons.

BRIEF SUMMARY

According to the present disclosure, the conventional, laborious measurement method of differential mode delay (DMD) discussed above is eliminated by utilizing a wavefront sensor (e.g., Shack-Hartmann wavefront sensor) to measure the DMD of an optical fiber. As opposed to conventional discrete time domain measurements that are made sequentially as the input laser is scanned across an optical fiber's input, the present disclosure enables a parallel measurement of the fiber's entire core (not just a slice of the core), which can be several orders of magnitude faster than conventional sequential measurement techniques. Also, the present disclosure enables an optical fiber under test to be fully characterized over a two-dimensional plane, as opposed to being characterized in a single slice though a single plane as is done in conventional DMD measurement techniques.

In addition, the present disclosure enables technicians to measure differential mode delay during testing of optical fibers in a field environment, which cannot be done using conventional optical fiber testing techniques. The ability to measure differential mode delay during testing of optical fibers in a field environment can result in substantial cost savings compared to conventional techniques. For example, conventionally if an optical network in a data center is being upgraded to support a greater bandwidth or data rate, previously installed optical fibers that are not characterized by their manufacturers as supporting the greater bandwidth or data rate are typically removed and replaced, which can be extremely costly. The present disclosure enables the previously installed optical fibers to be tested without being removed. If testing demonstrates that the previously installed optical fibers can support the greater bandwidth or data rate, there is no need to replace the previously installed optical fibers, which can result in significant cost savings.

A system for testing an optical fiber according to the present disclosure may be summarized as including an optical source apparatus and an optical image sensor apparatus. The optical source apparatus includes a first fiber optic and a light emitting device. The first fiber optic connector is configured to connect to a first end of the optical fiber. The light emitting device, in operation, emits light into the first end of the optical fiber while the first fiber optic connector is connected to the first end of the optical fiber. The optical image sensor apparatus includes a second fiber optic connector, an image sensor, a lens array, and a processor. The second fiber optic connector is configured to connect to a second end of the optical fiber. The image sensor, in operation, receives the light emitted into the first end of the optical fiber that is output from the second end of the optical fiber while the second fiber optic connector is connected to the second end of the optical fiber, and generates image data corresponding to the light that is received by the image sensor. The lens array is in an optical path between the second fiber optic connector and the image sensor. The lens array includes a plurality of optical lenses. The processor is coupled to the image sensor. In operation, the processor determines a plurality of two-dimensional positions based on the image data output from the image sensor, and determines a test result based on the plurality of two-dimensional positions.

In operation, the processor may determine a plurality of distances of detected focal points of a waveform exiting the optical fiber and impinging on the lenses array from a plurality of spatial positions of nominal focal points derived from a planar waveform impinging on the lens array based on the plurality of two-dimensional positions, and determine the test result based on the plurality of distances.

The optical source apparatus may further include beam-shaping optics disposed between the light emitting device and the first fiber optic connector.

The processor, in operation, may illuminate at least one light emitting diode or display a numeric value or an image on a display device based on the test result. The numeric value may indicate a maximum bandwidth or data rate that is supported by the optical fiber.

The optical image sensor apparatus may further include an input device which, in operation, outputs a signal in response to an input operation, and the processor, in operation, may obtain at least one test parameter based on the signal output by the input device, and determine the test result based on the at least one test parameter. The at least one test parameter may indicate a length of the optical fiber, a bandwidth supported by the optical fiber, or a data rate supported by the optical fiber.

Another system for testing an optical fiber according to the present disclosure may be summarized as including an optical source apparatus and an optical image sensor apparatus. The optical source apparatus includes a first fiber optic connector and a laser. The first fiber optic is connector configured to connect to a first end of the optical fiber. The laser, in operation, emits light into the first end of the optical fiber while the first fiber optic connector is connected to the first end of the optical fiber. The optical image sensor apparatus includes a second fiber optic connector and a wavefront sensor. The second fiber optic connector is configured to connect to a second end of the optical fiber. The wavefront sensor includes an image sensor, a lens array, and a processor. The image sensor, in operation, receives the light emitted into the first end of the optical fiber that is output from the second end of the optical fiber while the second fiber optic connector is connected to the second end of the optical fiber, and generates image data corresponding to the light that is received by the image sensor. The lens array is in an optical path between the second fiber optic connector and the image sensor. The lens array includes a plurality of optical lenses. The processor is coupled to the image sensor. In operation, the processor determines a plurality of two-dimensional positions based on the image data output from the image sensor, and determines a test result based on the plurality of two-dimensional positions.

In operation, the processor may determine a plurality of distances of detected focal points of a waveform exiting the optical fiber and impinging on the lenses array from a plurality of spatial positions of nominal focal points derived from a planar waveform impinging on the lens array based on the plurality of two-dimensional positions, and determine the test result based on the plurality of distances.

In operation, the processor may illuminates at least one light emitting diode or display a numeric value or an image on a display device based on the test result. The processor, in operation, may obtain at least one test parameter, and determines the test result based on the at least one test parameter. The at least one test parameter may indicate a length of the optical fiber, a bandwidth supported by the optical fiber, or a data rate supported by the optical fiber.

A method of testing an optical fiber according to the present disclosure may be summarized as including: providing an optical source apparatus including a first fiber optic connector; providing an optical image sensor apparatus including a second fiber optic connector; emitting light into a first end of the optical fiber while the first fiber optic connector is connected to the first end of the optical fiber; receiving, at a lens array in an optical path between the second fiber optic connector and an image sensor, the light emitted into the first end of the optical fiber that is output from a second end of the optical fiber while the second fiber optic connector is connected to the second end of the optical fiber, wherein the lens array includes a plurality of optical lenses; receiving at the image sensor the light emitted into the first end of the optical fiber that is output from the second end of the optical fiber and that is transmitted through the lens array; generating image data corresponding to the light received by the image sensor; determining a plurality of two-dimensional positions based on the image data; and determining a test result based on the two-dimensional positions.

The method may further include determining a plurality of distances of detected focal points of a waveform exiting the optical fiber and impinging on the lenses array from a plurality of spatial positions of nominal focal points derived from a planar waveform impinging on the lens array based on the plurality of two-dimensional positions, and the test result may be determined based on the plurality of distances.

The method may further include beam-shaping the light before the light enters the first end of the optical fiber.

The method may further include illuminating at least one light emitting device diode or displaying a numeric value or an image based on the test result. The numeric value may indicate a maximum bandwidth or data rate that is supported by the optical fiber.

The method may further include obtaining at least one test parameter, and the determining the test result may include determining the test result based on the plurality of two-dimensional positions and the at least one test parameter. The at least one test parameter may indicate a length of the optical fiber. The at least one test parameter may indicate a bandwidth or a data rate supported by the optical fiber.

DETAILED DESCRIPTION

Figure 1:
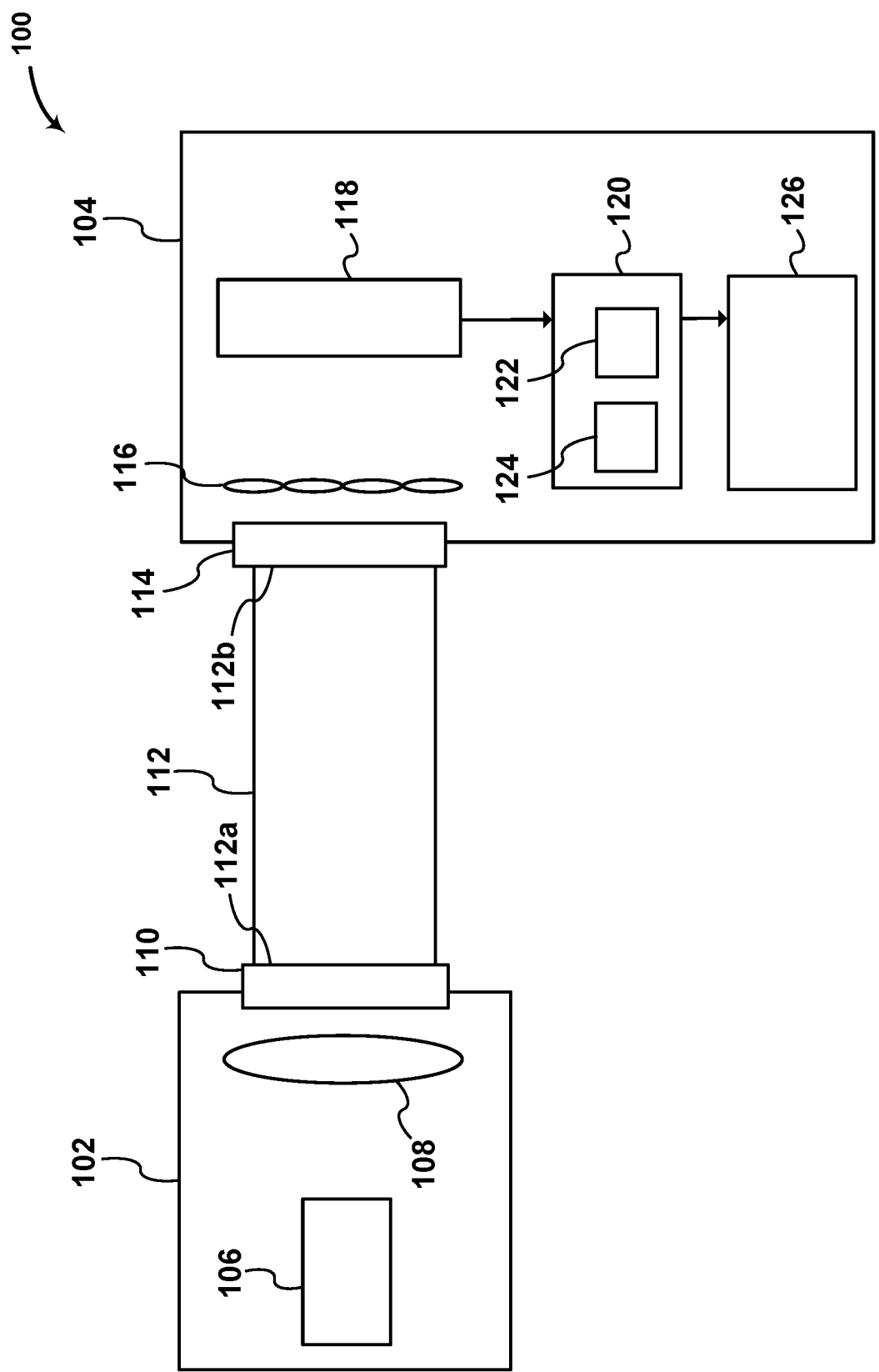
FIG. 1 is a block diagram of an optical fiber testing system according to one or more embodiments of the present disclosure.

FIG. 1 is a block diagram of an optical fiber testing system 100 according to one or more embodiments of the present disclosure. The optical fiber testing system 100 includes an optical source apparatus 102 and an optical image sensor apparatus 104.

The optical source apparatus 102 includes a light emitting device 106, beam-shaping optics 108, and a fiber optic connector 110. In one or more embodiments, the beam-shaping optics 108 are collimating optics. The fiber optic connector 110 is configured to connect to a first end 112a of an optical fiber 112. The light emitting device 106, in operation, emits light into the first end 112a of the optical fiber 112 while the fiber optic connector 110 is connected to the first end 112a of the optical fiber 112. In one or more implementations, the light emitting device 106 is a laser source. The beam-shaping optics 108 are disposed between the light emitting device 106 and the fiber optic connector 110. In one or more embodiments, the fiber optic connector 110 is a male Standard Connector (SC) type of fiber optic connector that connects via a female-female SC type of fiber optic adapter to a male SC type of fiber optic connector that is coupled to the first end 112a of the optical fiber 112.

The optical image sensor apparatus 104 includes a fiber optic connector 114, a lens array 116, an image sensor 118, a processing device 120 with a processor 122 and a memory 124, and a test result indicator 126. The fiber optic connector 114 is configured to connect to a second end 112b of the optical fiber 112. In one or more embodiments, the fiber optic connector 114 is a female SC type of fiber optic connector that connects to a male SC type of fiber optic connector that is coupled to the second end 112b of the optical fiber 112. In one or more embodiments, the lens array 116 includes a plurality of identical lenses. The image sensor 118, in operation, receives the light emitted into the first end 112a of the optical fiber 112 that is output from the second end 112b of the optical fiber 112 while the fiber optic connector 114 is connected to the second end 112b of the optical fiber 112, and generates image data corresponding to the light that is received by the image sensor 118. In one or more embodiments, the image sensor 118 is a charge-coupled device (CCD). The processing device 120 receives the image data generated by the image sensor 118. The memory 124 stores instructions which, when executed by the processor 122, cause the processor 122 to process the image data and determine a test result related the optical fiber 112, as described below.

In one or more embodiments, the test result indicator 126 includes one or more light emitting diodes (LEDs), and the memory 124 stores instructions that, when executed by the processor 122, cause the processor 122 to illuminate at least one of the LEDs of the test result indicator 126 based on a test result, to indicate the test result. For example, if the processor 122 determines that the optical fiber 112 passes a particular test, the processor 122 outputs a signal that causes power to be provided to a green LED to illuminate the green LED. Also, if the processor 122 determines that the optical fiber 112 does not pass a particular test, the processor 122 outputs a signal that causes power to be provided to a red LED to illuminate the red LED.

In one or more embodiments, the test result indicator 126 includes a display device (e.g., a liquid crystal display device), and the memory 124 stores instructions that, when executed by the processor 122, cause the processor 122 to output a signal that causes information, such as a numeric value, to be displayed on the display device of the test result indicator 126 based on a test result, to indicate the test result. The numeric value can indicate a maximum bandwidth or data rate, for example, that is supported by the optical fiber 112, which is determined based on the image data output by the image sensor 118.

In one or more embodiments, the test result indicator 126 includes one or more input devices (e.g., touchscreen, rotating knob, button, etc.) which, in operation, outputs a signal in response to an input operation. Also, the memory 124 stores instructions that, when executed by the processor 122, cause the processor 122 to obtain at least one test parameter based on the signal output by the input device, and to obtain test result data indicating a test result based on the at least one test parameter. For example, the at least one test parameter can indicate a length of the optical fiber, a bandwidth of the optical fiber, or a data rate of the optical fiber.

Figure 2:
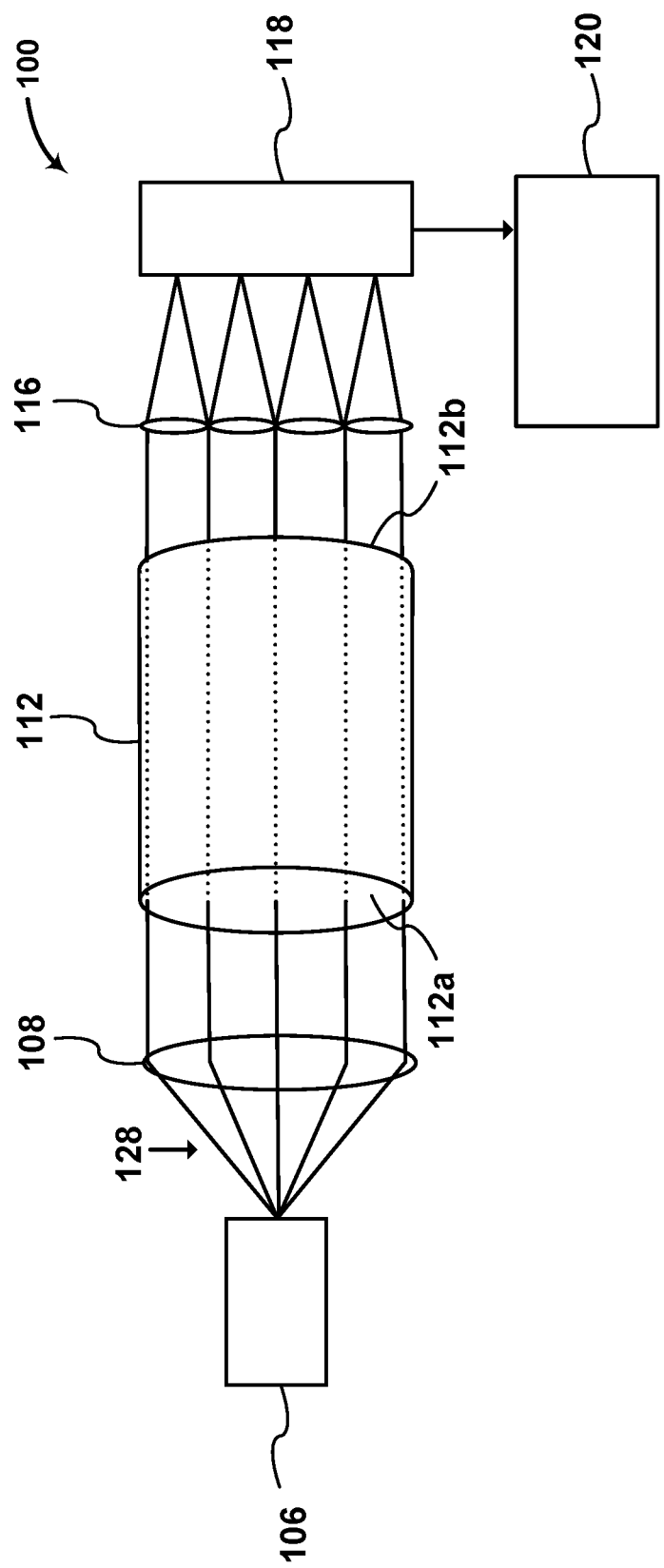
FIG. 2 is a diagram for explaining light transmission in the optical fiber testing system shown in FIG. 1.

FIG. 2 is a diagram for explaining light transmission in the optical fiber testing system 100 shown in FIG. 1. Light emitted by the light emitting device 106 follows a plurality of optical paths 128. The beam-shaping optics 108 include one or more lenses that convert divergent light beams emitted by the light emitting device 106 into parallel beams before the light beams enter the first end 112a of the optical fiber 112. The beam-shaping optics 108 create a planar wavefront that is transmitted into the first end 112a of the optical fiber 112. The wavefront of the light exiting an exit pupil at the second end 112b of the optical fiber 112 is distorted due to modal delays of the light while the light traversed the optical fiber 112. The exiting wavefront impinges the lens array 116, which then acts upon the light in the wavefront to project the light toward focal points onto the image sensor 118. The position of the focal points on the image sensor 118 can then be used to calculate the modal delay of the light based on the respective spatial location of the focal points.

More particularly, an image of the exit pupil at the second end 112b of the optical fiber 112 is projected onto the lens array 116. Each lens of the lens array 116 occupies a small part of an aperture corresponding to the exit pupil, called a sub-pupil, and forms an image of a sub-aperture on the image sensor 118. The lens array 116, the image sensor 118, and the processing device 120 included in the optical image sensor apparatus 104 thus form a wavefront sensor. In one or more embodiments, the lens array 116, the image sensor 118, and the processing device 120 included in the optical image sensor apparatus 104 form a Shack-Hartmann wavefront sensor.

When a wavefront exiting from the second end 112b of the optical fiber 112 is planar, all images of the sub-apertures are located in a regular grid at nominal positions defined by the geometry of the lens array 116. When a wavefront exiting from the second end 112b of the optical fiber 112 is distorted (e.g., not planar), the images of the sub-apertures become displaced from their respective nominal positions. Displacements of image centroids in two orthogonal directions X and Y are proportional to the average wavefront slopes in X and Y directions over the respective imaged sub-apertures. The processing device 120 measures the wavefront slopes based on the image data output by the image sensor 118, wherein the wavefront itself is reconstructed from the arrays of measured slopes, up to a constant which is of no importance for imaging. When the lens array 116, the image sensor 118, and the processing device 120 included in the optical image sensor apparatus 104 form a Shack-Hartmann wavefront sensor, the resolution of the Shack-Hartmann wavefront sensor is equal to the size of the sub-apertures.

Figure 3B:
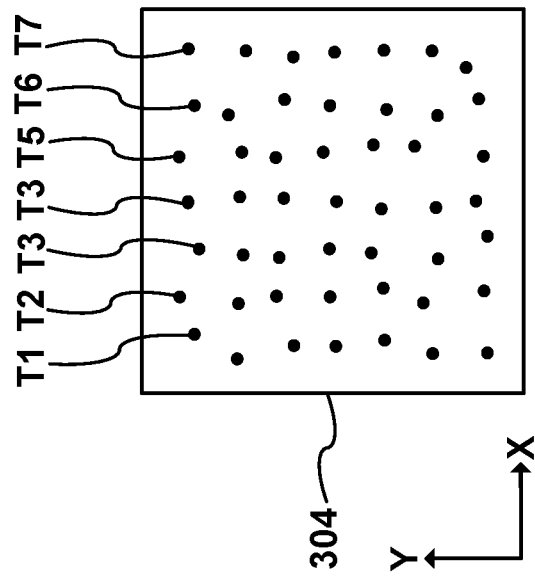
FIGS. 3A and 3B are diagrams for explaining a determination of test results in the optical fiber testing system shown in FIG. 1.
Figure 3A:
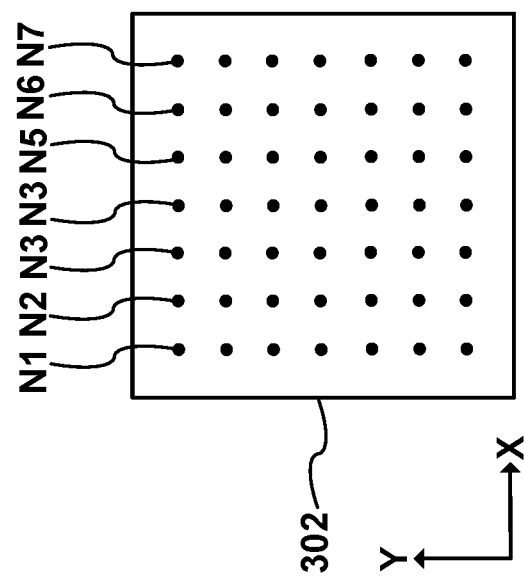

FIGS. 3A and 3B are diagrams for explaining a determination of test results in at least one embodiment of the optical fiber testing system 100 shown in FIG. 1. FIG. 3A shows an example image 302 corresponding to image data output by the image sensor 118 when a wavefront exiting from the second end 112b of the optical fiber 112 is planar.

The image 302 includes a plurality of picture elements or pixels arranged in the X and Y directions, and the image data include a plurality of pixel values respectively corresponding to the plurality of pixels. The processing device 120 identifies a plurality of areas corresponding to the focal points that are projected onto the image sensor 118 by the light exiting the lens array 116. The processing device 120 identifies a plurality of groups of pixels respectively corresponding to those areas by determining which pixels have pixels values that are greater than or equal to a predetermined threshold pixel value, and then determines a plurality of pixels or nominal points N1, N2, N3, . . . etc., that are the respective centroids of the groups of pixels identified by the processing device 120. The processor 122 obtains (X, Y) coordinates for each of the nominal points N1, N2, N3, . . . etc., and stores values of those coordinates in the memory 124.

FIG. 3B shows an example image 304 corresponding to image data output by the image sensor 118 when a wavefront exiting from the second end 112b of the optical fiber 112 is distorted due to optical transmission characteristics of the optical fiber 112. The image 304 includes a plurality of picture elements or pixels arranged in the X and Y directions, and the image data include a plurality of pixel values respectively corresponding to the plurality of pixels. Similar to the process described above with regard to FIG. 3A, the processing device 120 identifies a plurality of areas corresponding to the focal points that are projected onto the image sensor 118 by the light exiting the lens array 116. The processing device 120 identifies a plurality of groups of pixels respectively corresponding to those areas by determining which pixels have pixels values that are greater than or equal to the predetermined threshold pixel value, and then determines a plurality of pixels or points T1, T2, T3, . . . etc., that are the respective centroids of the groups of pixels identified by the processing device 120. The processor 122 obtains (X, Y) coordinates for each of the points T1, T2, T3, . . . etc., and stores values of those coordinates in the memory 124.

In order to determine a test result, the memory 124 stores instructions that, when executed by the processor 122, cause the processor 122 to calculate a distance between each of the nominal points N1, N2, N3, . . . etc. in the image 302 and a corresponding one of the points T1, T2, T3, . . . etc. in the image 304. For example, if the point N1 has coordinates (X1, Y1) and the point T1 has coordinates (X2, Y2), the processor 122 calculates the distance D between the points N1 and T1 using Equation 1 below.

$$D = \sqrt{(X1-X2)^2 + (Y1-Y2)^2} \quad \text{(Equation 1)}$$

The processor 122 stores a value for each calculated distance between one of the nominal points N1, N2, N3, . . . etc. in the image 302 and a corresponding one of the points T1, T2, T3, . . . etc. in the image 304 in an array (or other suitable data structure) corresponding to a particular test. The processor 122 then compares each of the respective values in the array (or other suitable data structure) corresponding to the particular test to a corresponding value in a previously stored array (or other suitable data structure) corresponding to a particular type of optical fiber (e.g., an OM-3 type of optical fiber having a length of 25 meters that can support a maximum data rate of 100 Gigabits per second). In one implementation, if the difference between each of the values in the array (or other suitable data structure) corresponding to the particular test and a corresponding value in the previously stored array (or other suitable data structure) corresponding to the particular type of optical fiber (or some combination thereof) is less than or equal to a predetermined maximum difference value, the processor 122 determines that the optical fiber 112 under test passes the particular test. In this example, the processor 122 determines that the optical fiber 112 can support the maximum bandwidth or data rate. On the other hand, if the difference between each of the values in the array (or other suitable data structure) corresponding to the particular test and the corresponding value in the previously stored an array (or other suitable data structure) corresponding to the particular type of optical fiber (or some combination thereof) is greater than the predetermined maximum difference value, the processor 122 determines that the optical fiber 112 does not pass the test. In this example, the processor 122 determines that the optical fiber 112 does not support the maximum bandwidth or data rate.

In one or more embodiments, the memory 124 stores a plurality of arrays (or other suitable data structures) generated (e.g., in a laboratory) using a plurality of types of optical fibers. In this example, each of those arrays (or other suitable data structures) is associated with a value corresponding to the particular type of optical fiber, a value corresponding to a length of the optical fiber, and a value corresponding to a maximum bandwidth or data rate that is supported by the particular type of optical fiber. An operator may provide input to select from a menu or otherwise specify one or more parameters for a particular type of optical fiber that is to be tested and a particular type of testing to be performed. The processor 122 uses those parameters to select an appropriate array (or other suitable data structure) that is compared with the array (or other suitable data structure) corresponding to the particular test. For example, if the user specifies parameters indicating an OM-4 type of optical fiber, a length of 100 meters, and a maximum data rate of 100 Gigabits per second, the processor 122 uses a stored array (or other suitable data structure) that was generated (e.g., in a laboratory) using an OM-4 type of optical fiber that has a length of 100 meters and supports a maximum data rate of 100 Gigabits per second.

In one or more embodiments, the processing device 120 calculates the delay in the optical fiber 112 from the distance D, and then compares the calculated delay to a standardized limit that has been established for a particular type of optical fiber, for example, defined by OM4. If the calculated delay is less than or equal to the standardized limit, the processing device 120 determines that the optical fiber 112 passes a particular test. If the calculated delay is greater than the standardized limit, the processing device 120 determines that the optical fiber 112 does not pass the particular test.

In one or more embodiments, the optical fiber testing system 100 can determine a maximum data rate for an optical fiber under test (e.g., optical fiber 112). For example, if an operator provides input to select or specify one or more parameters indicating an OM-4 type of optical fiber having a length of 100 meters and indicating that testing is to be performed to determine the maximum data rate supported by the optical fiber, the processor 122 may first compare the calculated distances to stored distances that are associated with a highest data rate (e.g., 100 Gigabits per second). If each of the respective differences between the calculated distances and the stored distances associated with the highest data rate (e.g., 100 Gigabits per second) is less than the predetermined maximum difference value, the processor 122 causes the display device included in the test result indicator 126 to display the numeric value "100", to indicate that the maximum data rate supported by the optical fiber is 100 Gigabits per second. If not, the processor 122 then compares the calculated distances to stored distances that are associated with a next highest data rate (e.g., 50 Gigabits per second). If each of the respective differences between the calculated distances and the stored distances associated with the next highest data rate (e.g., 50 Gigabits per second) is less than the predetermined maximum difference value, the processor 122 causes the display device included in the test result indicator 126 to display the numeric value "50", to indicate that the maximum data rate supported by the optical fiber is 50 Gigabits per second. If not, the processor 122 continues the above process until either a maximum data rate is identified, or the processor 122 determines that the optical fiber under test does not support a maximum data rate that is associated with a stored array (or other suitable data structure).

Figure 4:
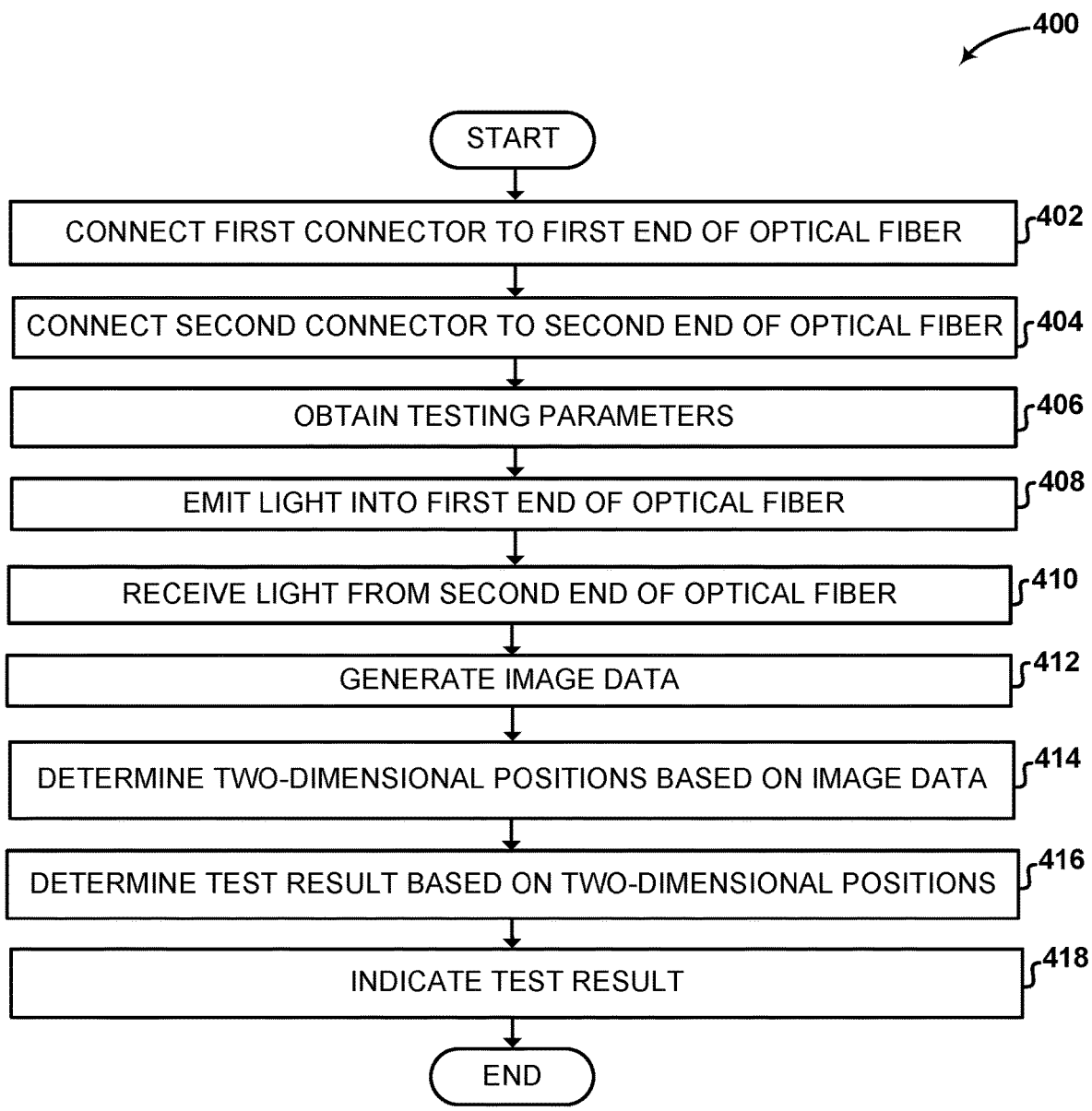
FIG. 4 is a diagram for explaining a method of using the optical fiber testing system shown in FIG. 1.

FIG. 4 is a diagram for explaining a method 400 of using the optical fiber testing system 100 shown in FIG. 1. The method 400 begins at 402.

At 402, an operator connects the fiber optic connector 110 of the optical source apparatus 102 to the first end 112a of the optical fiber 112. For example, when field testing is performed, the fiber optic connector 110 of the optical source apparatus 102 is connected at a far end of the optical fiber 112.

At 404, an operator connects the fiber optic connector 114 of the optical image sensor apparatus 104 to the second end 112a of the optical fiber 112. For example, when field testing is performed, the fiber optic connector 114 of the image sensor apparatus 104 is connected at a near end of the optical fiber 112.

At 406, the processor 122 of the processing device 120 obtains one or more testing parameters. For example, the one or more testing parameters indicate a data rate of the optical fiber 112. By way of another example, the optical fiber testing system 100 performs a process that measures a length of the optical fiber 112, and the processing device 120 obtains the length of the optical fiber 112 measured by that process at 406.

At 408, the light emitting device 106 of the optical source apparatus 102 emits light into the first end 112a of the optical fiber 112, as described above in connection with FIG. 2.

At 410, the image sensor 118 of the optical image sensor apparatus 104 receives the light exiting from the second end 112b of the optical fiber 112, as described above in connection with FIG. 2.

At 412, the image sensor 118 of the optical image sensor apparatus 104 generates image data corresponding to the light received at 410, as described above in connection with FIGS. 3A and 3B.

At 414, the processing device 120 of the optical image sensor apparatus 104 determines two-dimensional positions, e.g., indicating the focal points of the light on the image sensor, based on the image data output at 412. For example, the two-dimensional positions determined at 414 correspond to (X, Y) coordinates of the points N1, N2, N3, . . . etc. shown in FIG. 3B, which are the respective centroids of the groups of pixels identified by the processing device 120, as described above in connection with FIGS. 3A and 3B.

At 416, the processing device 120 of the optical image sensor apparatus 104 determines a test result using calculations based on the two-dimensional positions determined at 414. For example, the processing device 120 of the optical image sensor apparatus 104 uses calculated distance values to determine whether the optical fiber 112 can support a specified data rate, which is indicated by a testing parameter obtained at 406.

At 418, the processing device 120 of the optical image sensor apparatus 104 indicates the test result. For example, by the processing device 120 causes a numeric value corresponding to a maximum data rate supported by the optical fiber 112 to be displayed on the display device of the test result indicator 126. Additionally or alternatively, the processing device 120 causes an image of a graph indicating delay values as a function of x, y positions to be displayed on the display device of the test result indicator 126. Additionally or alternatively, the processing device 120 causes an LED of the test result indicator 126 to illuminate.

The various embodiments described above can be combined to provide further embodiments. For example, a testing parameter obtained at 406 may indicate a particular application that is to be supported the optical fiber 112. The memory 124 may store a plurality of arrays (or other suitable data structures) generated (e.g., in a laboratory) using a plurality of types of optical fibers that can support the particular application. The processing device 120 may illuminate a green LED at 418 to indicate that the optical fiber can support the application, or may illuminate a red LED at 418 to indicate that the optical fiber cannot support the particular application.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus for testing optical fibers, comprising:
   a fiber optic connector configured to connect to an end of an optical fiber;
   an image sensor configured to receive light from the end of the optical fiber while the fiber optic connector is connected to the end of the optical fiber, and generate image data corresponding to the light;
   a lens array, placed in an optical path between the fiber optic connector and the image sensor, configured to cause a projection of a plurality of focal points of the light onto the image sensor, wherein the lens array includes a plurality of lenses configured to cover a core of the optical fiber; and
   a processor, coupled to the image sensor, configured to determine a test result of the optical fiber based on spatial characteristics of the plurality of focal points.

2. The apparatus according to claim 1, wherein spatial characteristics of the plurality of focal points comprises a plurality of two-dimensional positions of the plurality of focal points, and the processor is further configured to:
   determine the plurality of two-dimensional positions of the plurality of focal points based on the image data generated by the image sensor;
   determine a distance from the two-dimensional positions of the plurality of focal points to a plurality of spatial positions of nominal focal points derived from a planar waveform impinging on the lens array; and
   determine the test result based on the distance.

3. The apparatus according to claim 2, wherein the processor is further configured to indicate a passing test result in response to the distance being less than or equal to a predetermined maximum value.

4. The apparatus according to claim 2, wherein the processor is further configured to:
determine a mode delay value based on the distance;
compare the mode delay value with a stored value; and
indicate the optical fiber passes a test in response to the mode delay value being less than or equal to the stored value.

5. The apparatus according to claim 2, wherein the test result is associated with a category of the optical fiber, and the processor is further configured to determine the category of the optical fiber based on the distance.

6. The apparatus according to claim 2, wherein the test result is associated with a bandwidth of the optical fiber, and the processor is further configured to determine the bandwidth of the optical fiber based on the distance.

7. The apparatus according to claim 1, wherein the processor is further configured to cause a numeric value or an image to be displayed on a display device or at least one light emitting diode to illuminate based on the test result.

8. The apparatus according to claim 7, wherein the numeric value or the image indicates a mode delay, a bandwidth, or a category of the optical fiber.

9. The apparatus according to claim 1, wherein the lenses are identical and cover an entirety of the core of the optical fiber while the end of the optical fiber is connected to the fiber optic connector.

10. The apparatus according to claim 1, wherein each of the plurality of lenses is configured to occupy a part of an aperture, and each of the plurality of lenses is configured to form an image of a sub-aperture on the image sensor.

11. A method for testing optical fibers, comprising:
receiving light at a lens array from an end of an optical fiber, wherein the lens array includes a plurality of lenses that cover a core of the optical fiber;
detecting a plurality of focal points of the light; and
determining a test result of the optical fiber based on spatial characteristics of the plurality of focal points.

12. The method according to claim 11, wherein spatial characteristics of the plurality of focal points comprises a plurality of two-dimensional positions of the plurality of focal points, and the method further comprises:
determining the plurality of two-dimensional positions of the plurality of focal points based on image data generated by an image sensor;
determining a distance from the two-dimensional positions of the plurality of focal points to a plurality of spatial positions of nominal focal points derived from a planar waveform impinging on the lens array; and
determining the test result based on the distance.

13. The method according to claim 12, further comprising:
indicating a passing test result in response to the distance being less than or equal to a predetermined maximum value.

14. The method according to claim 12, further comprising:
determining a mode delay value based on the distance;
comparing the mode delay value with a stored value; and
indicating the optical fiber passes a test in response to the mode delay value being less than or equal to the stored value.

15. The method according to claim 12, wherein the test result is associated with a category of the optical fiber, and the method further comprises determining the category of the optical fiber based on the distance.

16. The method according to claim 12, wherein the test result is associated with a bandwidth of the optical fiber, and the method further comprises determining the bandwidth of the optical fiber based on the distance.

17. The method according to claim 11, further comprising:
causing a numeric value or an image to be displayed on a display device or at least one light emitting diode to illuminate based on the test result.

18. The method according to claim 17, wherein the numeric value or the image indicates a mode delay, a bandwidth, or a category of the optical fiber.

19. The method according to claim 11, wherein the lenses are identical and cover an entirety of the core of the optical fiber while the end of the optical fiber is connected to a fiber optic connector.

20. The method according to claim 11, wherein each of the plurality of lenses is configured to occupy a part of an aperture, and each of the plurality of lenses is configured to form an image of a sub-aperture on an image sensor.

* * * * *